J. F. CARLSON.
COMBINATION LEVEL AND PLUMB.
APPLICATION FILED JULY 19, 1912.
1,084,606.
Patented Jan. 20, 1914.
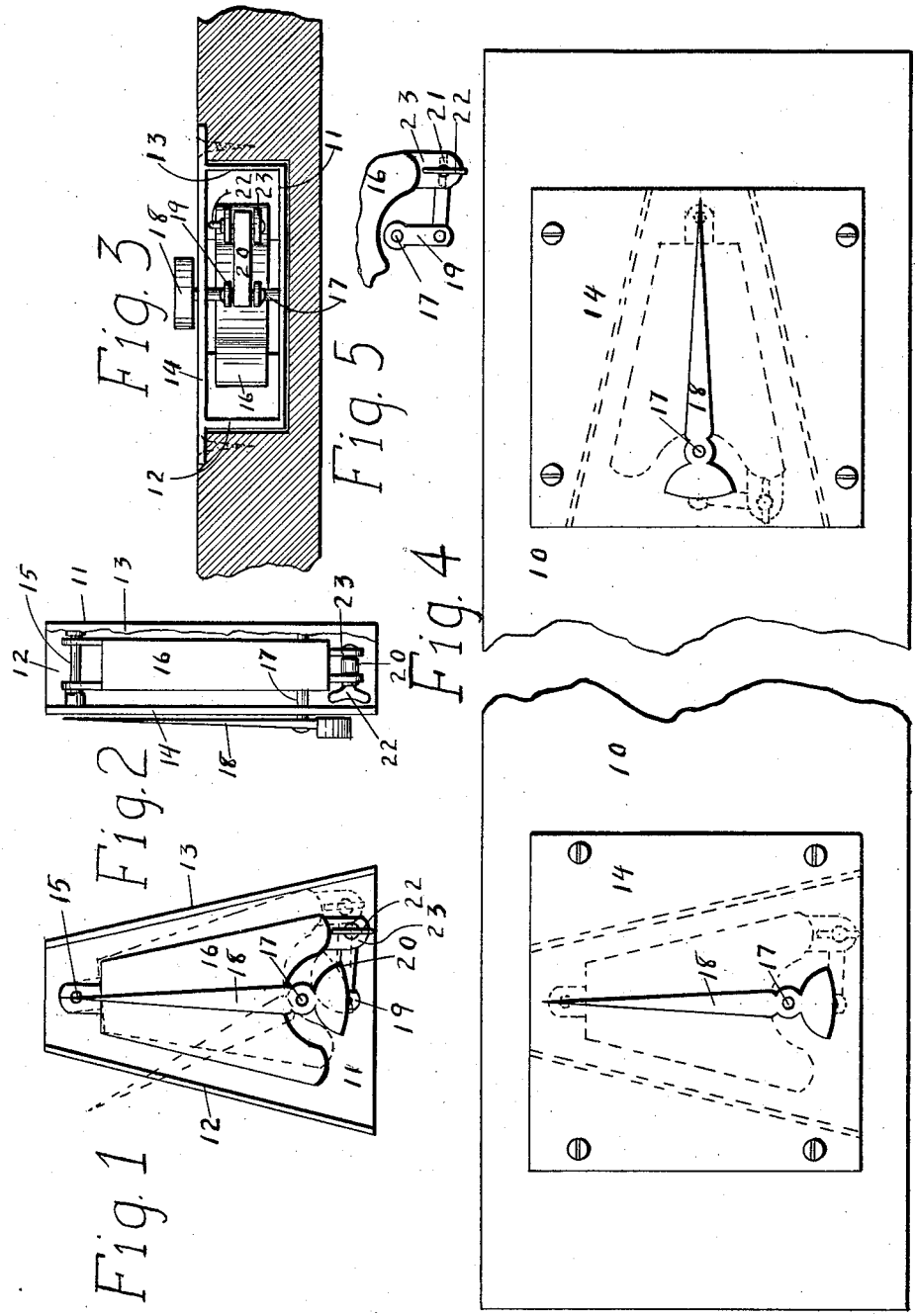
Witnesses
R. Smith
Lucille Roe
Inventor
John F. Carlson
Ozell & Roe Att'y's.

UNITED STATES PATENT OFFICE.

JOHN F. CARLSON, OF DES MOINES, IOWA.

COMBINATION LEVEL AND PLUMB.

1,084,606.  Specification of Letters Patent.  Patented Jan. 20, 1914.

Application filed July 19, 1912. Serial No. 710,406.

*To all whom it may concern:*

Be it known that I, JOHN F. CARLSON, a citizen of the United States, residing in Des Moines, county of Polk, and State of Iowa, have invented a new and useful Improvement in Combination Levels and Plumbs, of which the following is a specification.

The object of my invention is to provide a simple and accurate mechanically constructed leveling device, which can be embedded in a combination level and plumb to operate as a level, a second device of a like construction also being embedded therein, to operate as a plumb. I am aware that many mechanical devices of this character have been invented and patented but none of them seem to have the delicacy and accuracy which appears to be required and the old spirit levels are still in general use. As the spirit levels are so easily broken and must be handled with such extreme care, it is my object to perfect a mechanical substitute which will measure up to all the necessary or desirable requirements.

My invention consists of certain details of construction, hereinafter set forth, pointed out in my claims, and illustrated in the accompanying drawings, in which—

Figure I shows a front elevation view of my device, the front plate being removed; Fig. II shows a side elevation view of my device, a portion of the side being broken away; Fig. III shows an inverted plan view of the same; Fig. IV shows a side elevation of my combination level and plumb, a portion thereof being broken away; and Fig. V shows a detail view of an adjustable connection between the needle shaft and the weight.

Referring to the accompanying drawings, the reference numeral 10 is used to indicate the block of wood, or metal, which is used for the body of the combination level and plumb, the same being provided with two pockets 10, one to contain the leveling device and one to receive the plumb.

The numeral 11 is used to indicate the back plate of my recording device, the numerals 12 and 13 the side plates and the numeral 14 the front plate thereof. The front plate, which is attached to the side plates, is rectangular in conformation, and designed to be counter-sunk in the block 10 and by this means the device is anchored, by means of screws, or the like, in the said block.

The numeral 15 indicates a cross shaft centrally located near the upper part of the recording device, between the front and rear plates and suspended therefrom is a weight 16, concaved in its under surface, as shown.

The numeral 17 indicates a cross shaft, mounted, for rotary movement, centrally between the front and rear plates, said shaft 17 extending through the front plate and having secured to it a recording needle 18.

The numeral 19 indicates a pair of parallel arms secured to the shaft 17 and depending therefrom for the purpose of affording a bearing for one end of a loosely mounted link 20, the other end of the link being slotted, as shown at 21 and rigidly and adjustably connected, by means of the set screw 22, to a pair of arms 23 rigidly secured to one side of the weight 16.

It is obvious that, by the construction described, the oscillation of the weight 16 will oscillate, in the opposite direction, the needle 18, and the distance of oscillation may be recorded on any construction of a recording device desired.

By placing two of the devices in a single block, one as a leveling device and one as a plumb, it is obvious I secure a combination level and plumb.

Having thus described my invention what I claim and desire to secure by Letters Patent of the United States is:

1. In a device of the type set forth, a body having a pocket, a transverse shaft at one end of the pocket, a weight suspended at one end from the shaft and having its opposite end concaved, a second shaft in the pocket disposed in the concavity of said concaved end of the weight, a pair of arms depending from the second shaft, a pair of arms depending from one side of the weight, and a link connected at one end to the first named arms and at its opposite end to the second named arms, and a needle secured to the second shaft.

2. In a device of the type set forth, a body, a weight suspended at one end from the body, a cross shaft at the other end of the weight located in spaced relation to the latter, a projection depending from the weight at its said other end and at one side of the weight, an arm depending from the cross shaft, a connection between the arm and projection, and a needle on the cross shaft.

JOHN F. CARLSON.

Witnesses:
ZELL G. ROE,
LUCILLE ROE.

Copies of this patent may be obtained for five cents each, by addressing the "Commissioner of Patents, Washington, D. C."